(12) United States Patent
Shelest et al.

(10) Patent No.: US 7,698,548 B2
(45) Date of Patent: Apr. 13, 2010

(54) COMMUNICATIONS TRAFFIC SEGREGATION FOR SECURITY PURPOSES

(75) Inventors: Art Shelest, Tamarac, FL (US); Eran Yariv, Redmond, WA (US); David Abzarian, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1160 days.

(21) Appl. No.: 11/297,717

(22) Filed: Dec. 8, 2005

(65) Prior Publication Data

US 2007/0136783 A1    Jun. 14, 2007

(51) Int. Cl.
*H04L 29/06*    (2006.01)
(52) U.S. Cl. .......................................... 713/154; 726/1
(58) Field of Classification Search .................. 713/154
See application file for complete search history.

(56) References Cited

U.S. PATENT DOCUMENTS

| | | | |
|---|---|---|---|
| 6,772,345 B1* | 8/2004 | Shetty | 726/24 |
| 7,117,533 B1* | 10/2006 | Libenzi | 726/24 |
| 2003/0131256 A1* | 7/2003 | Ackroyd | 713/201 |
| 2005/0216770 A1* | 9/2005 | Rowett et al. | 713/201 |
| 2006/0153204 A1* | 7/2006 | Wang et al. | 370/400 |
| 2006/0206300 A1* | 9/2006 | Garg et al. | 703/27 |
| 2006/0253908 A1* | 11/2006 | Yang | 726/24 |
| 2006/0259967 A1* | 11/2006 | Thomas et al. | 726/22 |
| 2007/0011741 A1* | 1/2007 | Robert et al. | 726/22 |

OTHER PUBLICATIONS

Likavec et al., "Enforcing Messaging Security Policies", 2005, IEEE, pp. 1-8.*

* cited by examiner

*Primary Examiner*—Matthew B Smithers

(57) ABSTRACT

Technology for applying a communications traffic security policy in which a distinct communications traffic flow is segregated based upon a security value; whereby the communications traffic security policy include one or both of a detection and an enforcement policy. The detection policy may include determining whether the segregated communications traffic flow involves malware; and, the enforcement policy may include a malware policy.

20 Claims, 5 Drawing Sheets

COMMUNICATIONS TRAFFIC SEGREGATION FOR SECURITY PURPOSES

BACKGROUND

Networked computers and computer systems such as those connected to the Internet face an ever-present threat of infection by a variety of types of software which may be intended to or which may actually accomplish harm. These bits of malicious software may include viruses, worms, Trojan horses, spyware, bots, and other causative agents, inter alia, which may separately or collectively be generally referred to as malware.

Computer security systems are ever-evolving in attempts to better detect malware intrusions and to better enforce security policies upon detection. Existing security systems include intrusion detection policies to detect improper or questionable traffic in a computer or other communications network, and enforcement policies that are used to permit or deny certain types of network traffic in efforts to provide access control. Among the challenges faced by these and other policy driven systems is the richness or diversity of human and computer interactions, which makes it very difficult to determine how to effectively monitor computer traffic for security detection and enforcement purposes. This richness or diversity makes it especially difficult to predetermine how computer users may act in various situations, thus providing challenges to pre-establishing an effective detection or enforcement policy.

SUMMARY

Implementations described and claimed herein address the foregoing and other problems by providing technologies and/or techniques for segregating computer or communications traffic into two or more separate classifications or categories defined by security values. In a first example, communications traffic may be segregated by a characterization that the traffic either is associated with or is not associated with user participation. Traffic segregation can also include tagging data packets with identifiers or interpreting existing identifiers representing a categorization of those data packets so that the data traffic can be tracked and interpreted according to specific policies of a particular categorization. Detection policies may then determine whether the traffic is appropriate or inappropriate relative to the particular categorization. Enforcement policies may then halt or otherwise divert inappropriate traffic and may allow appropriate traffic to continue its travel. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

BRIEF DESCRIPTIONS OF THE DRAWINGS

FIG. 1 schematically illustrates a computing device as it may be connected to a computer network.

DETAILED DESCRIPTIONS

Figure 1:
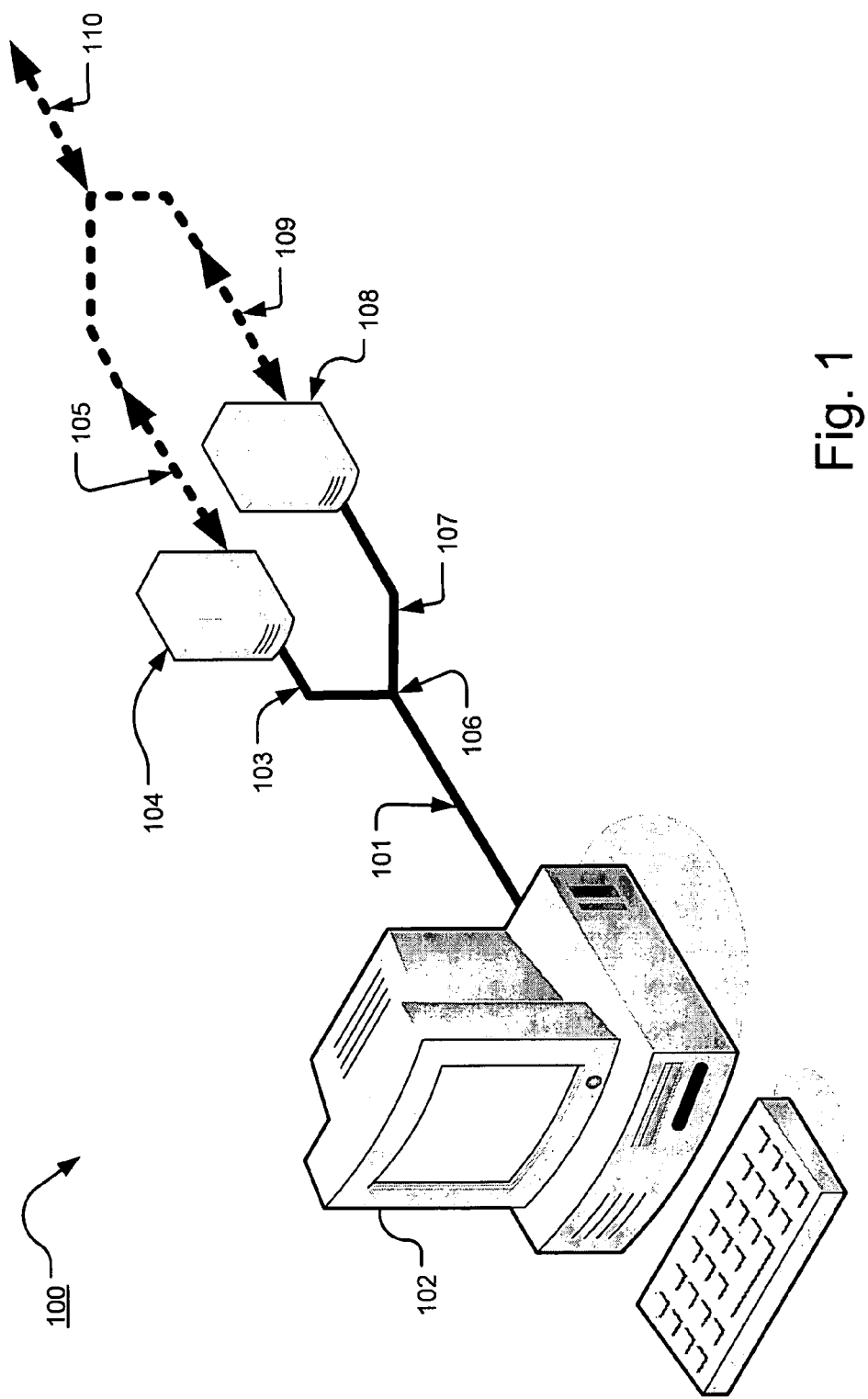

FIG. 1 illustrates an example computer or other communications system 100 for implementation of traffic segregation as described hereinbelow. Such a communications system 100 may include a computer device 102 which may be a PC, a host or other device that may provide for user interaction and/or network communication. The computer device 102 has a network connection 101 for connection of the computer device 102 to a network 110. Network 110 is only schematically represented here at the discrete opposing end of the connection 101 and the branches therefrom. The network 110 to which the device 102 may be connected may include one or more of a local network (LAN) or a wide area network (WAN) or may be or may include the Internet. Note the networks may also include wireless connectivity.

As indicated schematically in FIG. 1, the network connection 101 may provide for segregation of two or more computer or other communications data traffic flows illustrated by the separate branching datapaths 103 and 107. Note, the branching is a schematic representation in FIG. 1, although a physical device such as a router or gateway may be included at the branch point 106 of connection 101 to divert (or integrate) the segregated flows to (or from) the branching datapaths 103, 107. Indeed, such a router or gateway or like device could accomplish the segregating operation described further below. Alternatively, this segregating function could take place entirely within the computing device 102 or elsewhere in the system. Note, a wireless router or like devices could be used herein as well.

Further schematically shown in FIG. 1 are two separate security components 104, 108 of the present communications system 100. The security components 104, 108 are shown as they may reside in or may be connected to the respective datapaths 103, 107 and as they may be connected or may provide further connectivity via respective paths 105, 109 to a network 110 (note, the words connected and connectivity both connote wireless connection as well). The security components 104, 108 are intended to provide security features, such as the implementation of any detection policies and/or enforcement policies on any data traffic flowing thereto. Note, these security components 104, 108 may either be software, hardware or firmware for or may be physical devices incorporating software, hardware or firmware for implementing the security features. As such, they may alternatively represent a processor and a module or modules executing on the processor to provide the detection and/or enforcement functions described below. Moreover, these components 104, 108 may either be incorporated within the computing device 102 or may be separate therefrom. If separate therefrom, they may be in a centralized security device (not shown) used to provide security for one or a plurality of computing devices like device 102. Often, such components 104, 108 will be implemented as a part of a firewall, security engine or like security feature. Thus the rules of the policy or policies could be implemented as security software by a local firewall or a centralized firewall.

Figure 2:
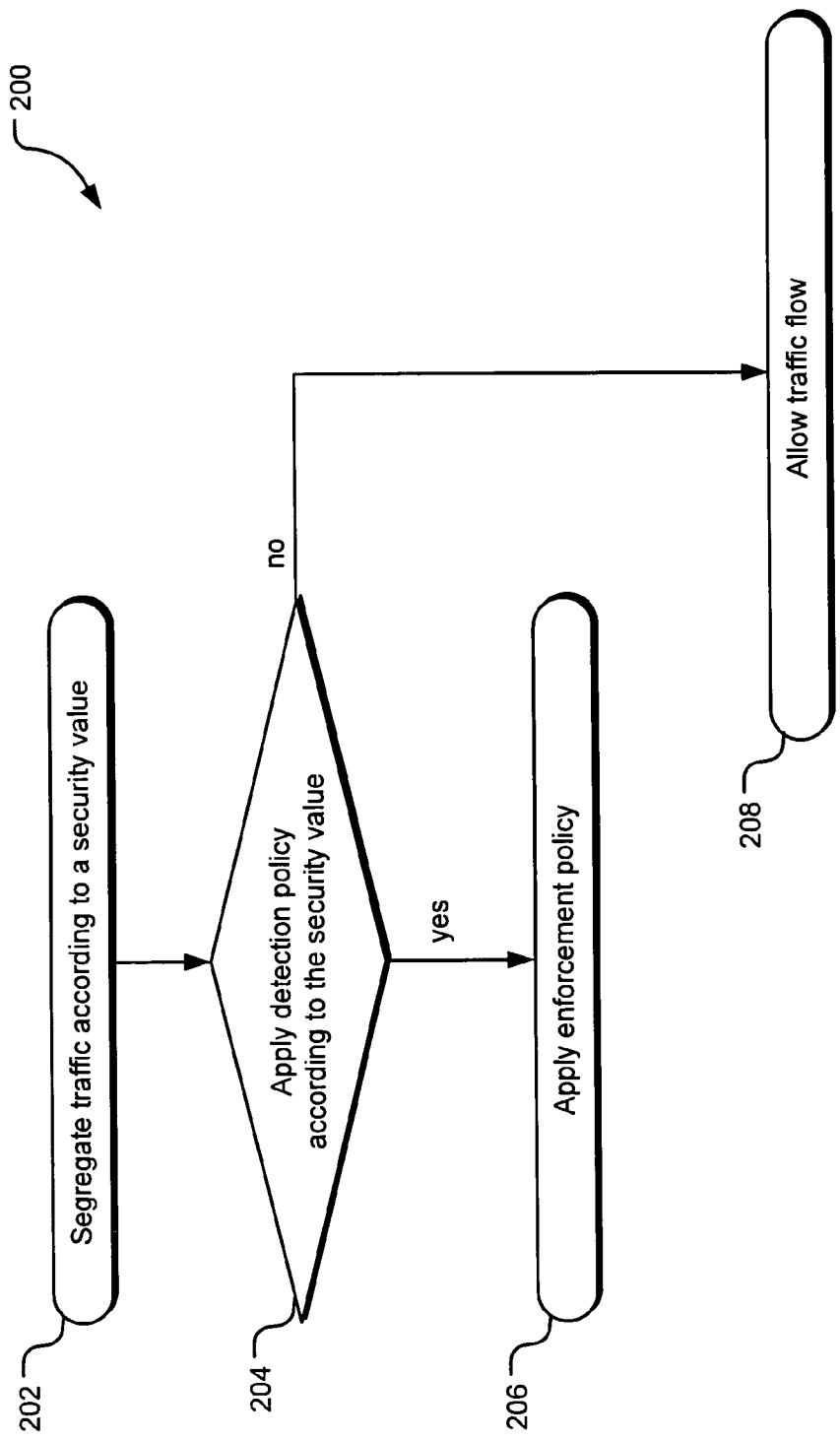
FIG. 2 illustrates example operations for implementation of traffic segregation for security purposes.

FIG. 2 presents an illustration of an implementation 200 of traffic segregation for security purposes. In this illustration, the data traffic or communications traffic flow is first segregated into two or more distinct communications traffic flows, see operation 202, according to a particular characteristic of or exhibited by the traffic, here defined as a security value. Security values are described in further detail herein below. Then, an operation 204 of applying a detection policy according to the security value may be performed on one or the other or both data flows to determine whether the segregated traffic involves or is associated with malware or other causative agent at which point, either a malware or other enforcement policy may be applied, see operation 206, or the data traffic may be allowed to continue its travel as shown by operation 208.

Relating this implementation 200 to the schematic representation of a computing or communications system 100 of FIG. 1, it may be noted that the first listed operation 202 for segregating traffic may be performed in the computing device 102, and thereafter routed along datapath 101 and branched into either of datapaths 103 or 107 depending upon the segregation result. Note, as introduced, it may be that another component or device (such as a router or gateway, neither shown) may be implemented in the system 100, either in the computing device 102 or in the datapath 101 to make the segregation according to operation 202. Moreover, note, that segregation as an operation may merely include an identification function involving identifying traffic by inherent features or sideband information. Thus, segregating may merely include understanding inherent characteristics and using them for discrimination. Otherwise, segregation may be more complex involving active categorization as by non-inherent or not immediately apparent characteristics. Active tagging or labeling of such traffic flows may then be performed, with active discrimination possible thereafter. Examples of such latter situations are provided below. Note, application of a policy herein may involve a variety of operations or steps, and may include execution of a program or a number of operations or steps. For example, the application of a detection policy may include one or more of identification, as well as assessment and/or determination of the aspects of the item being detected.

In either case then, referring again to FIGS. 1 and 2, the respective security component 104 or 108 to which the segregated data traffic is routed may perform one or more security reviews of the data traffic. These reviews may be by policy, such as by a detection policy and/or an enforcement policy. The initial review may thus include use or application of a detection policy, per operation 204, which provides a determination of whether characteristics are detected as prescribed by the policy. The result of such a determination, i.e., whether certain characteristics are detected may then further result in a determination of whether malware or some other software/process is involved or associated with the traffic flow. If so, i.e., if particular characteristics are detected (and/or whether malware may be determined to be associated therewith) as shown by the "yes" path in FIG. 2, then, an enforcement policy may be enforced, per operation 206, or if neither detection, see the "no" pathway of FIG. 2, nor enforcement requires otherwise, the data traffic may be allowed to proceed, see operation 208, to the network as though via communication lines 105 and/or 109 of FIG. 1. Note, the traffic flows which may be operated upon in this fashion may be initiated by or issued from the computing device 102 and sent outward therefrom to the network, or may be incoming from the network toward the computing device 102. Segregation and malware detection and/or security enforcement may thus take place in either or both directions.

Figure 3:
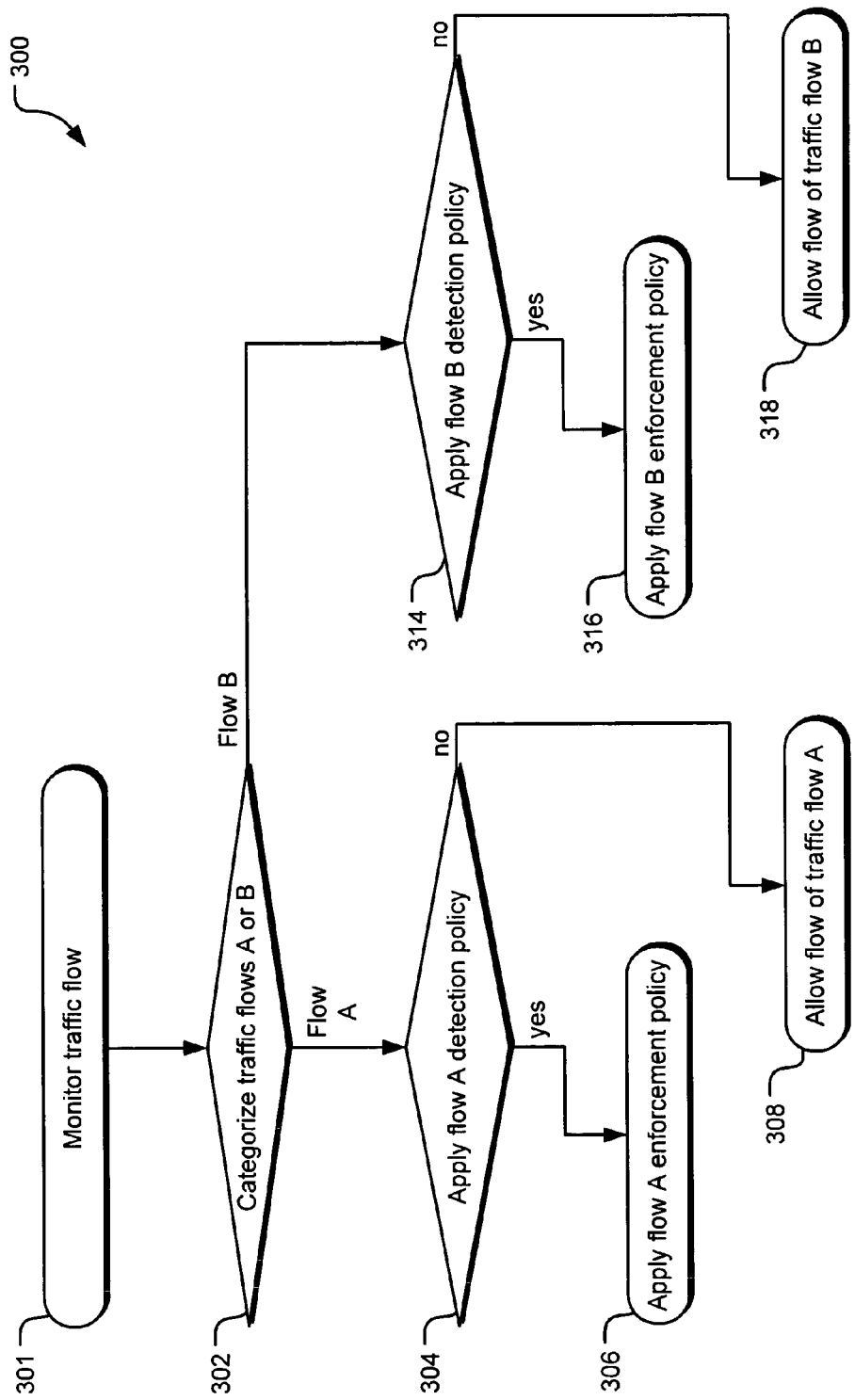
FIG. 3 illustrates alternative example operations for implementation of traffic segregation for security purposes.

FIG. 2 represents an implementation occurring for any one of two or more segregated data flows, and as shown below (see description relative to FIG. 4), may occur for only one such data traffic flow, or, as shown in FIG. 3, may be representative of the occurrences of processing for two (or more) data flows. More particularly as shown in FIG. 3, an alternative to initiate this or any like operation may include a monitoring of a data traffic flow, see operation 301; after which, per operation 302, the data traffic may be segregated, i.e., categorized as being a particular form of traffic, here identified generically as either traffic A and traffic B. Then, traffic flow A moves via the "Flow A" datapath, and traffic flow B moves via the "Flow B" datapath. Both such flows may have similar types of operations, such as the operations 304 and 314 which provide for applying detection policies for making characteristic detections (as for the determination of whether malware is associated therewith). These operations may provide for malware detection, inter alia, as described relative to operation 204 of FIG. 2. Then, for both flow paths A and B, as before, security enforcement may be implemented as at operations 306 and 316, or the data traffic may be allowed to progress to (or from) the network via operations 308 and/or 318. These FIG. 3 alternatives thus track the schematic representation of FIG. 1 in a similar way to that of the FIG. 2 implementation.

Following such schemes may provide computer network security via malware intrusion detection by using detection policies in review of network traffic and/or via network traffic enforcement which controls how and in what way one or more computers can communicate with other computers on a network such as on the Internet. Also, as introduced above, these operations may be performed, e.g., detection and/or enforcement at the computer, e.g., the computer device 102, itself, or at an intermediate node such as a network implemented firewall.

In more particularity, intrusion detection policies involve having the computer or communications system look for unusual and/or suspicious behaviors which with commingled communications traffic may not be a simple task. However, by segregating traffic into two or more distinct types as described here, the unusual or suspicious behaviors may be more pronounced and thus more readily detectable. This may be a result of having removed a whole class of otherwise uninteresting or unintelligible or otherwise merely obfuscating data traffic. As a first example, data traffic may be segregated into predictable traffic and less predictable traffic or data flows with either an anticipated traffic behavior or a non-anticipated behavior. These may occur in situations with scheduled traffic as opposed to user initiated or user intervention traffic. The user initiated or user intervention traffic is collectively and/or separately referred to as interactive traffic herein. The scheduled or regular non-user-interaction traffic is referred to as non-interactive traffic and at times also called or referred to as automatically-generated or "automotive" in the sense that it is generated and/or otherwise caused to flow without user interaction. As a category, automotive traffic includes those communications which may be performed on schedule, and as a class are thus expected and typically more predictable.

Then, based on patterns of communication or behaviors of the data or communications traffic, a detection policy may be implemented to determine when may be certain characteristic features such as those indicative of malware. An example behavior may be where one computer creates an amount of data traffic to contact a large number of computers in a short time period (e.g., traffic to contact thousands of computers (or another large number) in less than a minute (or another short pre-defined time period)). However, it may be that a human user has intended such an action, but, it may be predetermined that a normally operating computer would not itself generate such contacts. Thus, segregating the data traffic into the separate categories of human-initiated versus machine-generated traffic will provide for a proper policy analysis for determination of whether an inappropriate or undesired causative agent such as malware has generated the unusual, large amount of traffic. This determination may thus provide for the detection. Then a security enforcement policy may be implemented to either stop or divert the traffic, or to go even further and perhaps find and/or eliminate the causative agent or malware.

Note, in such an example, the detection determination or filter may be based only on the non-interactive or automotive traffic and not on the user-initiated traffic because it may be that only the otherwise pre-scheduled automatically-generated traffic is predictable enough to provide enough contrast against the unusual malware traffic generation. As before, the user-initiated traffic or traffic otherwise controlled by a user may and often will be less predictable, particularly, in that it may be that some users may indeed intend traffic patterns that would otherwise appear as if they were malware-generated.

Figure 4:
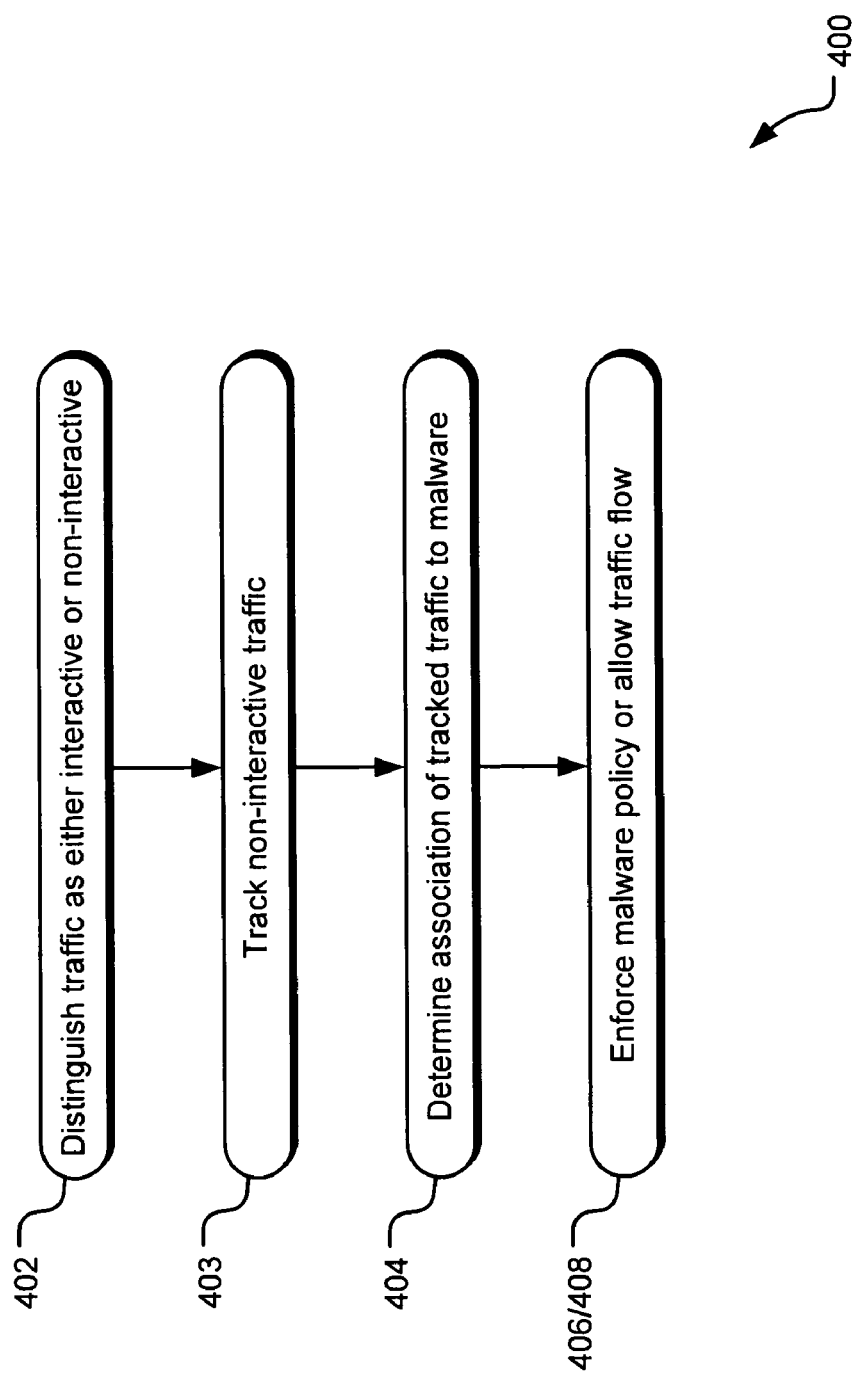
FIG. 4 illustrates still further alternative example operations for implementation of traffic segregation for security purposes.

This user-initiated/automotive or interactive/non-interactive categorization with tracking of only the non-interactive traffic is shown by example in the implementation 400 of FIG. 4 where the first operation 402 of distinguishing traffic involves providing the distinction of the user-interactive traffic versus that of the automatically-generated or non-interactive type. Then, per operation 403, the non-interactive traffic is tracked, and as described above, it may be that only this non-interactive traffic is tracked. A determination, per operation 404, may then be made by way of review of the tracked non-interactive traffic of whether malware may be involved in creation or movement of the particular traffic (as in the example rules where a certain minimum number of communications are generated in a certain minimal period of time). Then, the malware policy may be enforced or the traffic allowed to flow, per the combined operation 406/408. Opposite examples may also be useful, as for example where the user-interactive traffic is tagged (operation 402) and the non-tagged traffic is then tracked (operation 403) for determination of malware (operation 404) and further as before.

It may be that the data traffic has certain identifiers normally associated therewith; e.g., a personal computer can make distinctions between user-initiated traffic and automated traffic based upon sideband information. Thus, these normally-inherent or otherwise pre-applied identifiers may be used to make the necessary distinctions between the two or more categories of data traffic discriminated herein. However, as may also be common, such data traffic may not have normally distinctive identifiers (or such, if they may have existed, may be stripped therefrom or otherwise lost in process prior to being useful in an implementation here). Thus, a tag, label or other identifier may be affirmatively applied to the data traffic, or an appropriate portion thereof, as part of any of the implementations hereof. Tagging or labeling according hereto may include disposing information in the header of one or more data packets, or may take place purely within the computing device (particularly if a firewall implementation hereof is installed locally within the particular computing device). Another tagging/labeling alternative may be by port, either by port of departure from the computing device, or by port of destination as recorded either within the data packets themselves or in a look-up table associated with the ports and other destination or departure information. The data packet id fields may be used for this purpose, as for example, by the signed or un-signed fields thereof. Similarly, ephemeral or pseudo-random port ids, e.g., port numbers without real port associations, may be used for tagging or labeling.

Many implementations will apply one or more features as dynamic attributes. For example, the labeling of the data packets may be preferably dynamically applied as a part of the overall process so that readily-identifiable identifiers will reliably be used as opposed to any mimicking identifiers of the malware. Similarly, a dynamic application of traffic distinctions may also help avoid malware mimicry.

Examples of security values for segregation may further include whether application data is high priority/privilege or low priority/privilege (as set by the application software) and this may be for example a subset of the automotive categorization described above. Log-on types may provide another segregation value as for example guest users relative to regular users relative to administrative users. Other categories may be implemented when a distinct enforcement or detection policy may be determined which can make use of those categorical distinctions. Some primary examples of non-security values may include a distinction between ports as internet or intranet or any segregation by priority and cost. Other specific examples of alternative security values which could be used herewith include distinctions in whether the source application or service binary (and service name if applicable) is of interest; whether the traffic destination will be of interest (e.g., is this a valuable database server? is this an internal LOB server? is this a domain controller?); whether the data is encrypted or clear-text; or, whether the system is running quarantine or NAP; inter alia.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Figure 5:
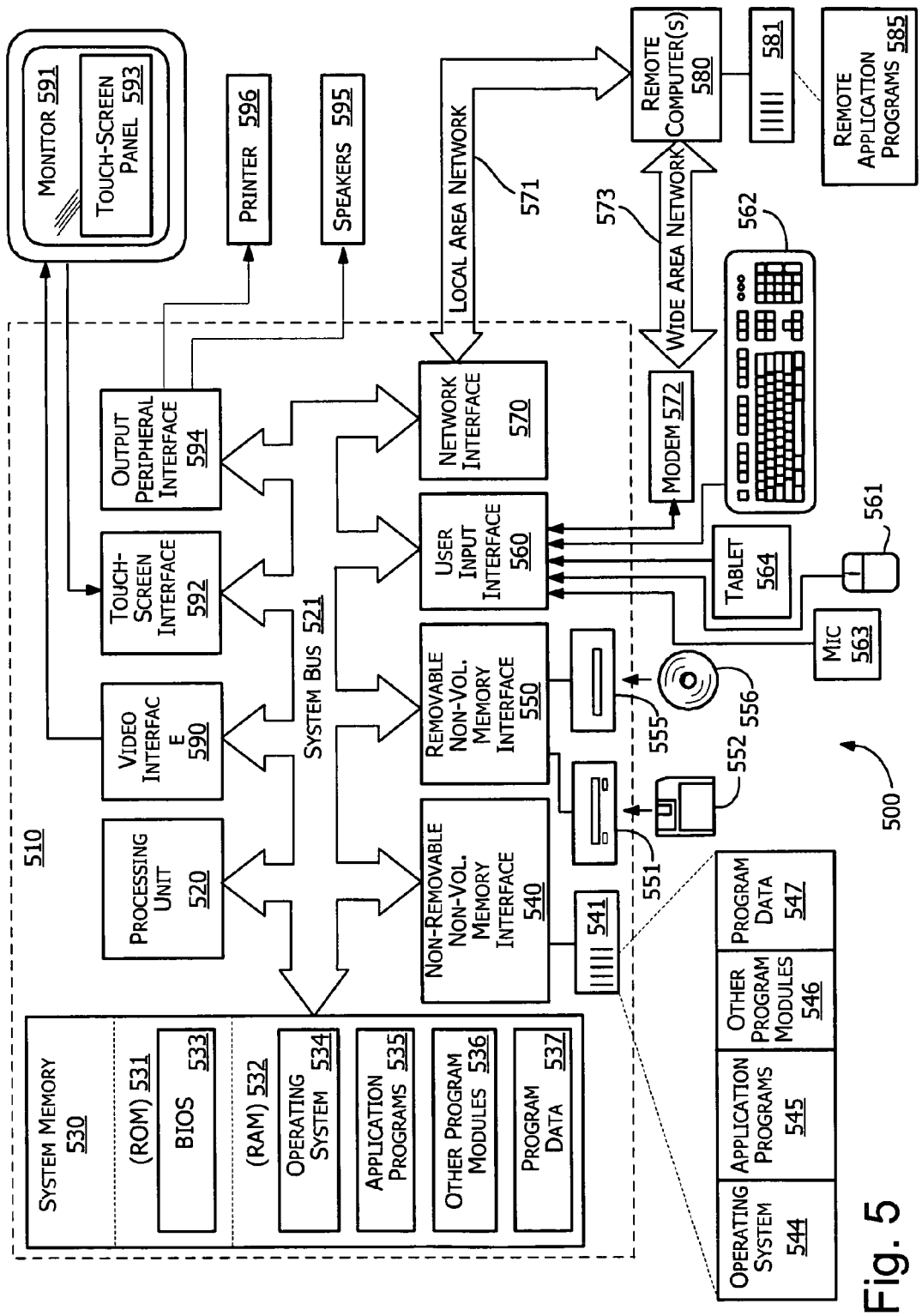
FIG. 5 illustrates a system that may be useful in implementing the described technology.

Example hardware and an operating environment are shown in FIG. 5 for implementing the technology hereof, these including a general purpose computing device in the form of a computer 520, including a processing unit 521, a system memory 522, and a system bus 523 that operatively couples various system components including the system memory to the processing unit 521. There may be only one or there may be more than one processing unit 521, such that the processor of computer 520 comprises a single central-processing unit (CPU), or a plurality of processing units, commonly referred to as a parallel processing environment. The computer 520 may be a conventional computer, a distributed computer, or any other type of computer; the invention is not so limited.

The system bus 523 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 524 and random access memory (RAM) 525. A basic input/output system (BIOS) 526, containing the basic routines that help to transfer information between elements within the computer 520, such as during start-up, is stored in ROM 524. The computer 520 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 are connected to the system bus 523 by a hard disk drive interface 532, a magnetic disk drive interface 533, and an optical disk drive interface 534, respectively. The drives and their associated computer-readable media provide nonvolatile storage of computer-readable instructions, data structures, program modules and other data for the computer 520. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 529, optical disk 531, ROM 524, or RAM 525, including an operating system 535, one or more application programs 536, other program modules 537, and program data 538. A user may enter commands and information into the personal computer 520 through input devices such as a keyboard 540 and pointing device 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port, or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The computer 520 may operate in a networked environment using logical connections to one or more remote computers, such as remote computer 549. These logical connections are achieved by a communication device coupled to or a part of the computer 520; the invention is not limited to a particular type of communications device. The remote computer 549 may be another computer, a server, a router, a network PC, a client, a peer device or other common network node, and typically includes many or all of the elements described above relative to the computer 520, although only a memory storage device 550 has been illustrated in FIG. 5. The logical connections depicted in FIG. 5 include a local-area network (LAN) 551 and a wide-area network (WAN) 552. Such networking environments are commonplace in office networks, enterprise-wide computer networks, intranets and the Internet, which are all types of networks.

When used in a LAN-networking environment, the computer 520 is connected to the local network 551 through a network interface or adapter 553, which is one type of communications device. When used in a WAN-networking environment, the computer 520 typically includes a modem 554, a network adapter, a type of communications device, or any other type of communications device for establishing communications over the wide area network 552. The modem 554, which may be internal or external, is connected to the system bus 523 via the serial port interface 546. In a networked environment, program modules depicted relative to the personal computer 520, or portions thereof, may be stored in the remote memory storage device. It is appreciated that the network connections shown are examples only and other means of and communications devices for establishing a communications link between the computers may be used.

In an example implementation, a detection module, and an enforcement module, and/or other modules may be incorporated as part of the operating system 535, application programs 536, or other program modules 537. Transaction logs, enlistment records, and other data may be stored as program data 538.

The technology described herein may be implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example implementations of the present technology. Although various implementations of this technology have been described above with a certain degree of particularity, or with reference to one or more individual implementations, those skilled in the art could make numerous alterations to the disclosed implementations without departing from the spirit or scope of the technology hereof. Since many implementations can be made without departing from the spirit and scope of the presently described technology, the invention resides in the claims hereinafter appended. In particular, it should be understood that the described technology may be employed independent of a computer or like devices. Other implementation are therefore contemplated. Furthermore, it should be understood that any operation may be performed in any order, unless explicitly claimed otherwise or a specific order is inherently necessitated by the claim language. It is intended that all matter contained in the above description and shown in the accompanying drawings shall be interpreted as illustrative only of particular implementations and not limiting. Changes in detail or structure may be made without departing from the basic elements of the invention as defined in the following claims.

Accordingly, what is claimed is:

1. A method for applying a communications traffic security policy, comprising:
    segregating a distinct communications traffic flow based upon a security value that indicates user-interactive communications traffic flows for a computing device; and,
    applying an enforcement policy to the segregated communications traffic flow if it is determined that a user is not interacting with the computing device.

2. A method according to claim 1 comprising one or both of:
    determining via a detection policy whether the segregated communications traffic flow is associated with malware; and,
    enforcing via the enforcement policy a malware mitigation policy.

3. A method according to claim 1 comprising determining if a user is locally interacting with the computing device.

4. A method according to claim 1 wherein the segregated communications traffic flow comprises is one of:
  being allowed to continue its flow if a detection policy does not determine an association with malware; and
  being blocked from its flow if the detection policy determines an association with malware.

5. A method according to claim 1 wherein the application of the enforcement policy comprises blocking flow of the segregated communications traffic if a detection policy determines an association with malware.

6. A method according to claim 1 wherein segregating a communications traffic flow comprises one or both of:
  being performed by a computer with respect to a communications traffic flow within the computer; and,
  being performed by a centralized security engine with respect to one or more communications traffic flows from one or more computers.

7. A method according to claim 6 wherein the enforcement policy is implemented by one or both of the computer and the centralized security engine.

8. A method according to claim 1 wherein segregating a communications traffic flow comprises segregating by the security value two or more communications traffic flows.

9. A method according to claim 8 wherein the enforcement policy is applied to one or both of the two or more segregated communications traffic flows.

10. A method according to claim 8 wherein segregating the two or more communications traffic flows comprises dynamically tagging one or more of the two or more communications traffic flows.

11. A method according to claim 10 comprising tracking one or more of the dynamically tagged communications traffic flows.

12. A method according to claim 10 comprising tracking one or more of the communications traffic flows which have not been dynamically tagged.

13. A method according to claim 1 wherein a detection policy comprises rules for using a certain minimum number of traffic flows generated in a certain minimal period of time.

14. A computer-readable storage medium comprising computer-executable instructions for performing a computer process implementing the method of claim 1.

15. A method for applying a communications traffic policy comprising:
  segregating user interactive communications traffic flows from non-interactive communications traffic flows for a computing device;
  detecting whether one or more of the user interactive communications traffic flows are associated with malware; and
  if malware is detected, applying an enforcement policy that mitigates the user interactive communications traffic flows for the computing device.

16. A method according to claim 15 wherein segregating a communications traffic flows comprises segregating by a security value two or more communications traffic flows.

17. A method according to claim 16 wherein one or both of a detection policy and the enforcement policy are applied to one or both of the two or more segregated communications traffic flows.

18. A method according to claim 16 wherein segregating the two or more communications traffic flows comprises dynamically tagging one or more of the two or more communications traffic flows.

19. A computer-readable storage medium comprising computer-executable instructions for performing a computer process implementing the method of claim 15.

20. A computer system comprising a computing device and a connection for connecting the computing device to a network, the computer system comprising:
  a security policy component connected to or within one or both of the computing device and the connection; the security policy component comprising a processor and adapted to be executed thereby, and configured to serve as one or both of a detection module and an enforcement module to execute one or both of a detection policy and an enforcement policy in relation to a segregated communications traffic flow, the one or both of the detection and the enforcement policies defining a category for the segregation of the segregated communications traffic flow, wherein the category comprises user-interactive communications.

* * * * *